United States Patent [19]

Keznickl

[11] 4,187,008
[45] Feb. 5, 1980

[54] PHOTOGRAPHING OR PLAYBACK-DEVICE

[75] Inventor: Eduard Keznickl, Vienna, Austria

[73] Assignees: Karl Vockenhuber; Raimund Hauser, both of Vienna, Austria

[21] Appl. No.: 19,540

[22] Filed: Mar. 12, 1979

[30] Foreign Application Priority Data

Mar. 23, 1978 [AT] Austria ................................ 2068/78

[51] Int. Cl.$^2$ ............................................. G03B 41/06
[52] U.S. Cl. ..................................... 352/108; 352/109; 352/84
[58] Field of Search ............... 352/105, 106, 107, 108, 352/109, 110, 111, 114, 84

[56] References Cited

U.S. PATENT DOCUMENTS

| | | | |
|---|---|---|---|
| 1,401,345 | 12/1921 | Mechau | 352/108 |
| 2,843,006 | 7/1958 | Tyler | 352/119 |
| 3,539,250 | 11/1970 | Johnston | 352/119 |
| 3,556,647 | 1/1971 | Brandon | 352/107 |

*Primary Examiner*—Monroe H. Hayes
*Attorney, Agent, or Firm*—Martin A. Farber

[57] ABSTRACT

A photographing- or playback- device for a continuous photo picture carrier which is moved along a guide track by means of a drive device, particularly for motion picture film, with an optical imaging system and at least one mirrored surface which is movable about an axis, particularly a polygonal set of mirrors for the optical equalization of the image shifting as well as a light source if necessary. In the optical path between the guide track of the picture carrier and the mirror there is provided a partially-mirrored surface, which surface is inclined relative to the optical path and forms a part of an autocollimation system. By the partially-mirrored surface a part of the beam rays is deflectable, whereby the axis of the optical imaging system runs inclined or transverse relative to the beam axis (which beam axis runs between the guide track and the mirror) and runs to, or respectively from, the partially-mirrored surface, and the axis of the mirror also is arranged on the beam axis.

5 Claims, 2 Drawing Figures

PHOTOGRAPHING OR PLAYBACK-DEVICE

The invention relates to photographing- or playback-device for a continuous photo picture carrier which is moved along a guide track by means of a drive device, particularly for motion picture film, with an optical imaging system and at least one mirrored surface which is movable about an axis, particularly a polygonal set of mirrors for the optical equalization of the image migration shifting as well as if necessary under circumstances a light source.

Such a device for example is known from U.S. Pat. No. 2,666,356. Such type of devices serve either for photographing or reproduction of movie picture films or for sensing or scanning of data carriers for other purposes. In general in this manner a light source is provided, yet such a system would be conceivable in principle even with the utilization of daylight. Now for a long time it has been known (Joachim Rieck, "Technik der Wissenschaftlichen Kinematographie", Verlag Johann Ambrosius Barth, München 1968, pages 67–71) that in this manner the so-called error (or uncertainty) of tangents occurs. This is particularly the case with the use of a polygonal set of mirrors or drum scanner, and it still exists of course with tilting mirrors, the axis of rotation of which is outside of the plane of the mirrored reflecting surface. Further it is known that with a polygonal set of mirrors this tangent error is larger, the smaller the number of the mirrored surfaces in the polygon, that is, the larger the angle of inclination between the individual mirrored surfaces. For high speed cameras thus sets of mirrors with a large number of polygonal mirror surfaces were proposed. Since however the individual surfaces must have a certain minimum size, these polygonal mirrored frames get very large and have a corresponding spacial requirement. This is troublesome to the desire for manageable and compact devices.

It is an object of the invention to avoid the tangent errors and thereby to clear the way for a compact manner of construction.

In accordance with the invention this object is aided by a combination of the following features: in the optical path between the guide track (4) of the picture carrier (F) and the mirror (12) there is provided a partially-mirrored surface (15), which surface is inclined relative to the optical path and forms a part of an autocollimation system (8, 15); by means of the surface (15) a part of the rays is deflectable, whereby the axis (16) of the optical imaging system (8), inclined or transverse relative to the axis (13) of the rays, runs to, and respectively from, the partially-mirrored surface (15), which axis (13) of the rays runs between the guide track (4) and the mirror (12), and the mirror axis (11) also is arranged on the axis (13) of the rays.

In cooperative combination of the above, further in accordance with another object of the invention, in a per se known manner the partially-mirrored surface is formed by a diagonal surface (15) of a quadratic (or parallelepiped) prism or a cubic prism (17).

With the above and other objects in view the present invention will be more clearly understood from the following description of a preferred embodiment of the invention in connection with the accompanying drawing, of which:

Figure 1:
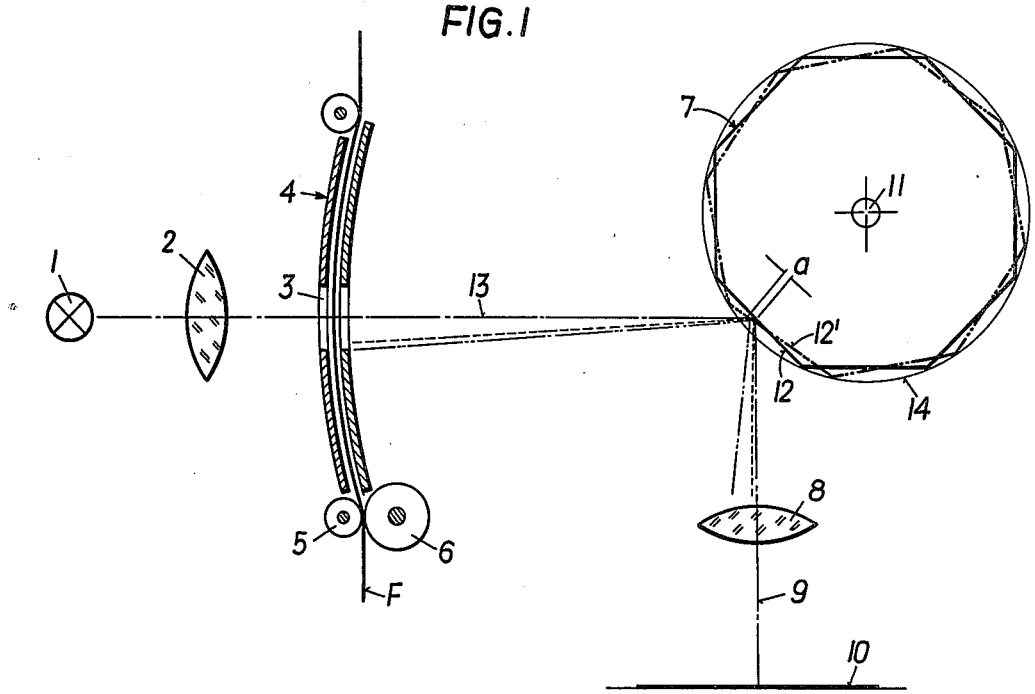
FIG. 1 is a schematic illustration of the state of the art.

Referring now to the drawings, and more particularly to FIG. 1, corresponding to the arrangement of U.S. Pat. No. 2,666,356, a schematically indicated condenser lens system 2 is provided behind a light source, which lens system directs the light of the light source 1 onto a film gate 3 of a picture frame 4. A film F is continuously drawn through the picture frame 4 by means of a capstan pinch roller 5 and a pressure or pad-roller (or castan idler) 6. A polygonal set of mirrors (a rotating mirror drum) 7 is driven synchronously with the movement of the film F. The mirror drum 7 feeds the light of the light source 1 (which light arrives through the picture frame gate 3) to an imaging system 8 with an optical axis 9. The imaging system 8 images the picture information (which is contained on the film F) onto a screen 10. This screen 10 can be a conventional viewing or observation screen; it can thereby however also be the pick-up screen of a video camera or the like.

As evident, in this manner there results a deflection of the beam axis at the mirror surfaces of the polygonal mirrored drum 7, which drum turns about an axis or axle 11. If now the mirror surface 12 lies at or under 45° with respect to the optical axis of the imaging system 8 and with respect to the axis 13 of the light which originates from the light source 1, as this is illustrated with full lines in FIG. 1, thus this mirror surface 12 represents geometrically a secant of the perimeter 14 of the polygonal set of mirrors 7. If from this, the mirror surface 12 arrives in the dot-dashed position 12', then the incident light beam no longer impinges at the same place, as at first, but rather there results a height difference a, which is larger the larger the bend between the individual mirror surfaces, that is the fewer surfaces which the polygon of the mirror drum 7 has. In this manner there occurs a deflection or deviation of the light corresponding to the dash-dot course of the beam as illustrated instead of the desired dashed course as illustrated.

It has now been found that the difficulties essentially arise because conventionally the axes 9, 13 make or enclose an angle with each other. On the other hand indeed the light which emerges through the picture gate 3 must be fed to the screen 10 in some possible way.

Figure 2:
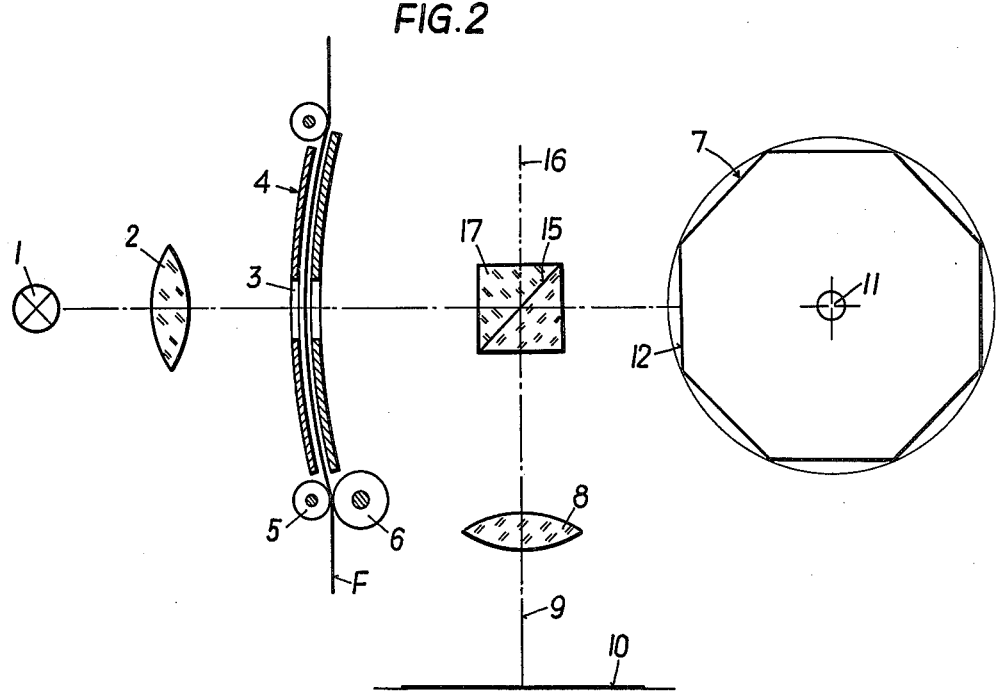
FIG. 2 shows a preferred embodiment of the device in accordance with the present invention.

FIG. 2 (which has similar reference characters representing similar parts of FIG. 1 relating to U.S. Pat. No. 2,666,356 which is hereby incorporated by reference herein) shows now how this takes place in accordance with the present invention. In this manner the axis of rotation 11 of the polygonal set of mirrors (rotating mirror drum) 7 lies in the linear extension of the axis 13 from the light source 1 through the picture frame gate 3, so that the light from the light source 1, passing through the picture gate 3, impinging on a mirrored surface 12 is reflected back in the same path 13. In this optical path 13 now there is provided a partially-mirrored surface 15 which permits the light rays coming from the light source 1 to pass therethrough along the axis 13 to the mirror 12, which partially-mirrored surface 15 also deflects the beam rays which return from the mirrored surface 12 into the axis 9 of the imaging system 8. Indeed by the partial-mirroring, a loss of light occurs, particularly in the direction of the partial axis 16. This light loss is however compensated in the manner that the entire optical system can be produced with a greater light transmitting capacity or higher luminosity of light intensity, which was not the case with the prior state of the art according to FIG. 1.

It is mentioned that the partially-mirrored surface 15 suitably is not formed on a plane-parallel plate, but rather is formed on a cubical prism 17 in order to avoid optical errors. It is further pointed out that indeed although the invention was explained on the basis of a set of mirrors or rotating mirrored drum, yet it is clear that the same conditions and prior art problems occur if the mirrored surface 12 is pivotable about the axis 11 as a tilting or oscillating mirror, in such a way that it is tilted back again into an initial position approximately at the end of its movement in the position 12' (FIG. 1), as this is conventional with tilting mirrors. The present invention thus is also applicable to such tilting mirrors.

While I have disclosed embodiments of the invention, it is to be understood that these embodiments are given by example only and not in a limiting sense.

I claim:

1. In a photographing- or playback- device for a continuous photo picture carrier which is moved along a guide track by means of a drive device, particularly for motion picture film, with an optical imaging system and at least one mirrored surface which is movable about a mirror axis, particularly a polygonal set of mirrors for the optical equalization of the image migration as well as a light source if necessary, the improvement further comprising a partially-mirrored surface disposed in the optical path between the guide track of the picture carrier and the at least one mirrored surface, a ray axis being defined runing between the guide track and said at least one mirrored surface, said partially-mirrored surface is inclined relative to the optical path and forms a part of an autocollimation system, the latter including the optical imaging system, said partially-mirrored surface constituting means for deflecting a part of the rays, the axis of the optical imaging system being transverse relative to the ray axis and running to, and respectively from, said partially-mirrored surface, the mirror axis of the at least one mirrored surface being aligned with said ray axis.

2. The photographing- or playback- device, as set forth in claim 1, wherein said partially-mirrored surface is formed by a diagonal surface of a quadratic prism.

3. The photographing- or playback- device, as set forth in claim 1, wherein said partially-mirrored surface is formed by a diagonal surface of a cubic prism.

4. The photographing- or playback- device, as set forth in claim 1, wherein said at least one mirrored surface comprises a rotating mirrored drum rotatably mounted about said mirror axis and containing the polygonal set of mirrors.

5. The photographing- or playback- device, as set forth in claim 1, wherein said at least one mirrored surface comprises a tilting mirror rotatably mounted about said mirror axis.

* * * * *